(12) United States Patent
Matsumoto

(10) Patent No.: US 9,639,291 B2
(45) Date of Patent: May 2, 2017

(54) MEMORY SYSTEM

(71) Applicant: Kabushiki Kaisha Toshiba, Minato-ku (JP)

(72) Inventor: Hajime Matsumoto, Higashimurayama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 260 days.

(21) Appl. No.: 14/636,376

(22) Filed: Mar. 3, 2015

(65) Prior Publication Data

US 2016/0070502 A1 Mar. 10, 2016

Related U.S. Application Data

(60) Provisional application No. 62/048,643, filed on Sep. 10, 2014.

(51) Int. Cl.
*G11C 5/14* (2006.01)
*G06F 3/06* (2006.01)

(52) U.S. Cl.
CPC .......... *G06F 3/0625* (2013.01); *G06F 3/0634* (2013.01); *G06F 3/0688* (2013.01)

(58) Field of Classification Search
CPC ..... G06F 3/0625; G06F 3/0634; G06F 3/0688
USPC .......... 365/226, 185.01, 185.05, 185.18, 129
See application file for complete search history.

(56) References Cited

U.S. PATENT DOCUMENTS

| 8,321,697 | B2 | 11/2012 | Fujimoto | |
|---|---|---|---|---|
| 8,799,689 | B2 | 8/2014 | Fujimoto | |
| 2004/0061521 | A1 | 4/2004 | Watanabe et al. | |
| 2012/0307561 | A1* | 12/2012 | Joo | G11C 16/0483 365/185.17 |
| 2012/0321083 | A1 | 12/2012 | Phadke et al. | |
| 2014/0304533 | A1 | 10/2014 | Fujimoto | |
| 2015/0162055 | A1* | 6/2015 | Yoo | G11C 5/147 365/226 |

FOREIGN PATENT DOCUMENTS

| JP | 1 305723 | 12/1989 |
|---|---|---|
| JP | 2009 258773 | 11/2009 |

* cited by examiner

*Primary Examiner* — Fernando Hidalgo
(74) *Attorney, Agent, or Firm* — Oblon, McClelland, Maier & Neustadt, L.L.P.

(57) ABSTRACT

According to one embodiment, there is provided a memory system including a non-volatile memory, a controller, a first interface circuit, a first signal line, and a second signal line. The controller is configured to control the non-volatile memory. The first interface circuit is configured to perform level conversion between a first power source level and a second power source level which is lower than the first power source level. The second power source level is used as a driving voltage of the controller. The first signal line is configured to connect to the first interface circuit. The second signal line is configured to connect the first interface circuit and a signal terminal of the controller. A potential of the second signal line is able to be pulled up to the second power source level.

20 Claims, 5 Drawing Sheets

MEMORY SYSTEM

CROSS-REFERENCE TO RELATED APPLICATIONS

This application is based upon and claims the benefit of priority from U.S. Provisional Application No. 62/048,643, filed on Sep. 10, 2014; the entire contents of which are incorporated herein by reference.

FIELD

Embodiments described herein relate generally to a memory system.

BACKGROUND

A memory system is connected to a host apparatus, and serves as an external storage medium of the host apparatus. At this time, there is a need to provide an interface circuit in the memory system in order to perform an interface operation with the host apparatus.

DETAILED DESCRIPTION

In general, according to one embodiment, there is provided a memory system including a non-volatile memory, a controller, a first interface circuit, a first signal line, and a second signal line. The controller is configured to control the non-volatile memory. The first interface circuit is configured to perform level conversion between a first power source level and a second power source level which is lower than the first power source level. The second power source level is used as a driving voltage of the controller. The first signal line is configured to connect to the first interface circuit. The second signal line is configured to connect the first interface circuit and a signal terminal of the controller. A potential of the second signal line is able to be pulled up to the second power source level.

Exemplary embodiments of a memory system will be explained below in detail with reference to the accompanying drawings. The present invention is not limited to the following embodiments.

First Embodiment

Figure 1A:
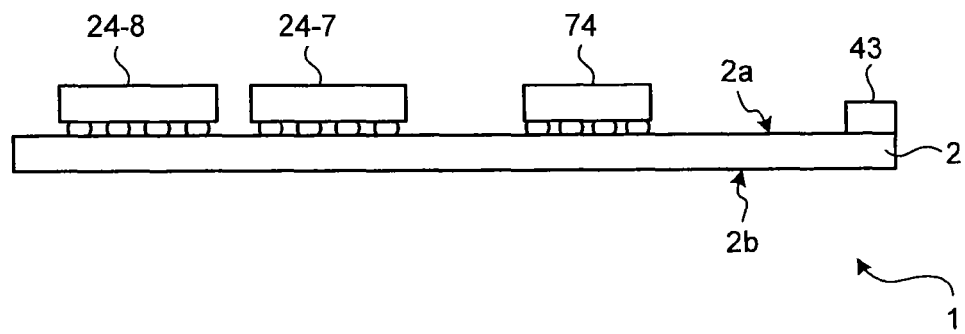
FIGS. 1A and 1B are diagrams illustrating a configuration of a memory system according to a first embodiment.
Figure 1B:
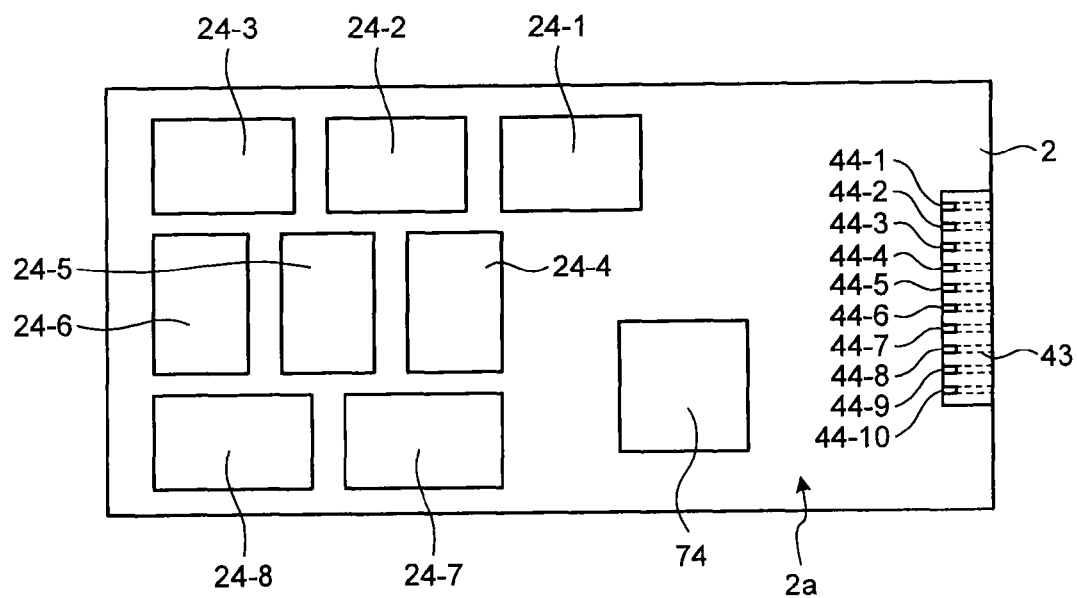

An external configuration of a memory system 1 according to a first embodiment will be described using FIGS. 1A and 1B. FIGS. 1A and 1B are diagrams schematically illustrating an example of the external configuration of the memory system 1, and FIG. 1A is a side view and FIG. 1B is an upper view of FIG. 1A.

The memory system 1 is connected to a host apparatus 100 through a connector 43 (see FIG. 2), and communicates with the host apparatus 100 through the connector 43 (for example, serial communication). Therefore, the memory system 1 serves as an external storage apparatus of the host apparatus 100.

The memory system 1, for example, may be a solid state drive (SSD), or may be a non-volatile storage device which is readable and writable such as a hard disk drive, a hybrid hard disk drive, a USB memory, and an SD card. The host apparatus 100, for example, may be an information processing apparatus such as a personal computer, a tester apparatus, a manufacturing apparatus, and an image capture apparatus such as a still camera or a video camera, or may be a portable terminal such as a tablet computer and a smart phone, or may be a game machine, or may be a vehicle terminal such as a car navigation. In the following, a case where the memory system 1 is the SSD and the host apparatus 100 is the personal computer will be described as an example.

As illustrated in FIGS. 1A and 1B, the memory system 1 includes a printed circuit board 2, a plurality of memory chips 24-1 to 24-8, a controller chip 74, and the connector 43.

The printed circuit board 2 has a principal surface 2a and a principal surface 2b. The principal surface 2b is a principal surface on the opposite side of the principal surface 2a. In the principal surface 2a of the printed circuit board 2, for example, the plurality of memory chips 24-1 to 24-8, the controller chip 74, and the connector 43 are disposed (see FIG. 1B).

The respective memory chips 24-1 to 24-8, for example, include a non-volatile memory 20 (see FIG. 2), and are mounted on the principal surface 2a of the printed circuit board 2 in a package form. For example, FIG. 1A illustrates an exemplary case where the memory chips are mounted in a ball grid array (BGA) method in which external terminals such as bumps connected to the respective memory chips 24-1 to 24-8 are connected to pads on the principal surface 2a of the printed circuit board 2, but another mounting method may be employed.

The controller chip 74, for example, includes a controller 70 (see FIG. 2), and is mounted on the principal surface 2a of the printed circuit board 2 in a package form. For example, the controller chip 74 controls the respective memory chips 24-1 to 24-8. In addition, FIG. 1A illustrates an exemplary case where the controller chip is mounted in the BGA method in which the external terminals such as the bumps connected to the controller chip 74 are connected to the pads on the principal surface 2a of the printed circuit board 2, but another mounting method may be employed.

The connector 43 is connected to a communication line group CL (see FIG. 2) to communicate with the host apparatus 100. In other words, the connector 43 includes a plurality of ports 44-1 to 44-10 which communicate with the host apparatus 100. The respective ports 44-1 to 44-10, for example, are connected to the controller chip 74 through substrate wirings (not illustrated) in the printed circuit board 2, and are connected to ports of the host apparatus 100 through the communication line group CL (see FIG. 2). In other words, an interface 4 between the memory system 1 and the host apparatus 100 is configured by ports UP1 and UP2 of the memory system 1, communication lines CL1 and CL2, and ports DP1 and DP2 of the host apparatus 100.

The memory system 1 receives a control signal (command) from the host apparatus 100 through the interface 4, and performs a control operation according to the received command. Further, the memory system 1 transmits a control signal (request) to the host apparatus 100 through the interface 4. For example, in order for the memory system 1 to communicate with the host apparatus 100 at a high speed, it is effective that the interface 4 is of a specification according to a high-speed interface standard. The high-speed interface standard, for example, is a PCI Express. Hereinafter, the PCI Express is denoted by a PCIe, and the interface 4 is denoted by the PCIe interface 4. In addition, while not illustrated in the drawings, other interfaces such as a low-speed interface and a power interface are further configured between the memory system 1 and the host apparatus 100.

Figure 2:
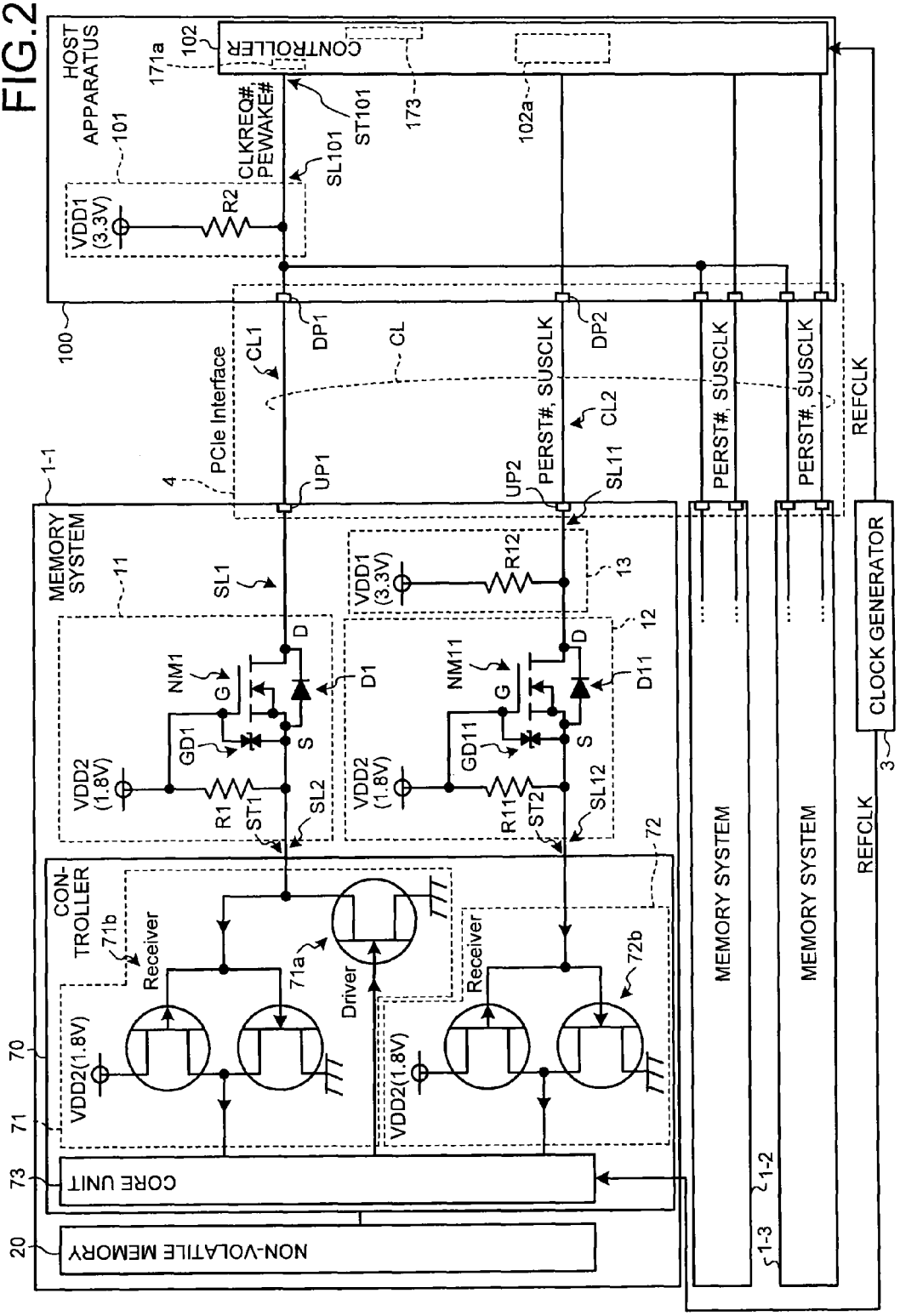
FIG. 2 is a block diagram illustrating the configuration of the memory system according to the first embodiment.

For example, as illustrated in FIG. 2, the memory system 1 includes the non-volatile memory 20 and the controller 70. FIG. 2 is a block diagram illustrating the configuration of the memory system 1. It should be noted that a plurality of memory systems 1-1 to 1-3 can be connected to the host apparatus 100. Hereinafter, although explanation regarding the memory system 1-1 is mainly described, other memory systems 1-2, 1-3 are similar to the memory system 1-1, and the memory system 1-1 is referred to as memory system 1.

The non-volatile memory 20 is a memory which stores data in a non-volatile manner, and for example, a non-volatile semiconductor memory such as a NAND flash memory and a resistance random access memory (ReRAM) can be employed. For example, the non-volatile semiconductor memory includes a memory cell array in which a plurality of memory cells are arranged in a matrix shape, and each memory cell, for example, may be configured to store multi-value data using an upper level page and a lower level page. The non-volatile semiconductor memory includes the plurality of memory chips 24-1 to 24-8 (see FIG. 1B). The respective memory chips 24-1 to 24-8 are configured by arranging a plurality of blocks which are a unit of data erase. Further, in the non-volatile semiconductor memory, data writing and data reading are performed for each page. The block is configured by a plurality of pages. In addition, the non-volatile memory 20 may be configured by a magnetic disk instead of the non-volatile semiconductor memory.

In a case where a write command and data are received through the PCIe interface 4, the controller 70 writes the data in the non-volatile memory 20 according to the write command. Further, in a case where a read command is received through the PCIe interface 4, the controller 70 reads data from the non-volatile memory 20, and transmits the read data to the host apparatus 100 through the PCIe interface 4.

The controller 70 includes I/O circuits 71 and 72 and a core unit 73. The core unit 73 receives signals through the I/O circuits 71 and 72, and performs a predetermined control according to the received signals. For example, in a case where the write command and the data are received through the I/O circuits 71 and 72, the core unit 73 writes the data in the non-volatile memory 20 according to the write command. Further, the core unit 73 outputs a signal through the I/O circuits 71 and 72 according to the predetermined control. For example, in a case where the read command is received through the I/O circuits 71 and 72, the core unit 73 reads data from the non-volatile memory 20, and outputs the read data through the I/O circuits 71 and 72.

In order to keep the cost of the memory system 1 illustrated in FIGS. 1A and 1B down, it is necessary to reduce a chip area while improving the functionality of the controller 70 (the controller chip 74). Therefore, circuit elements of the controller 70 (the controller chip 74) are miniaturized. In the controller 70, when the circuit elements are miniaturized, the allowable voltage for the circuit elements is lowered, so that it is difficult to prepare the I/O circuit for a first power source level VDD1 (for example, the driving voltage of the circuit is 3.3 V). For example, in the controller 70 (the controller chip 74), the allowable voltage for the circuit elements is restricted by the lowered voltage, a gate oxide film in the controller chip 74 is shared and a withstanding voltage of the gate oxide film corresponds to a second power source level VDD2 lower than the first power source level VDD1. Therefore, the controller 70 of which the circuit elements are miniaturized includes the I/O circuit corresponding to the second power source level VDD2 lower than the first power source level VDD1. For example, the I/O circuits 71 and 72 of the controller 70 correspond to the second power source level VDD2 (for example, the driving voltage of the circuit is 1.8 V).

On the other hand, the memory system 1 transmits or receives high-speed differential signals (TX, RX) with respect to the host apparatus 100 through the PCIe interface 4. Further, the memory system 1 transmits or receives the control signals required for the operation of the memory system 1 with respect to the host apparatus 100 through the PCIe interface 4. Examples of such control signals include a clock request signal CLKREQ#, a wakeup signal PEWAKE#, a reset signal PERST#, a suspend clock signal SUSCLK, and the like as illustrated in FIG. 2.

The clock request signal CLKREQ# is a signal to request for the supply of a high-speed clock signal REFCLK from a clock generator 3. In a case where the supply of the high-speed clock signal REFCLK is requested, the memory system 1 reflects the request on the level of the clock request signal CLKREQ# appearing in the communication line CL1. For example, the memory system 1 outputs the clock request signal CLKREQ# indicating the request for the supply of the high-speed clock signal REFCLK from a signal terminal ST1. Similarly, in a case where the supply of the high-speed clock signal REFCLK is requested, the host apparatus 100 reflects the request on the level of the clock request signal CLKREQ# appearing in the communication line CL1. For example, the host apparatus 100 outputs the clock request signal CLKREQ# indicating the request for the supply of the high-speed clock signal REFCLK from a signal terminal ST101. Then, the level of the clock request signal CLKREQ# appearing in the communication line CL1 may be changed according to the clock request signal CLKREQ# output from the signal terminal ST1 of the memory system 1 and the clock request signal CLKREQ# output from the signal terminal ST101 of the host apparatus 100. The clock generator 3 detects the level of the clock request signal CLKREQ# appearing in the communication line CL1, and performs control in a high-speed operation mode based on the detection result. The high-speed operation mode is an operation mode in which a signal is transmitted or received through the PCIe interface 4 in synchronization with the high-speed clock signal REFCLK. The clock generator 3, for example, secures a high-speed operation mode flag and controls a value thereof, and can check whether the high-speed operation mode is enabled or disabled as needed by referring to the value of the high-speed operation mode flag.

For example, in a case where at least either one of the memory system 1 and the host apparatus 100 detects that the supply of the high-speed clock signal REFCLK is requested, the clock generator 3 enables the high-speed operation mode of each of the memory system 1 and the host apparatus 100. For example, the clock generator 3 sets the value of the high-speed operation mode flag to an active value "1" based on the detection result. The clock generator 3 supplies the high-speed clock signal REFCLK to each of the memory system 1 and the host apparatus 100 during a period when the high-speed operation mode is enabled. Therefore, the transmitting and receiving of the signal through the PCIe interface 4 is performed in synchronization with the high-speed clock signal REFCLK.

In a case where the memory system 1 and the host apparatus 100 both detect that the supply of the high-speed clock signal REFCLK is not requested, the clock generator 3 disables the high-speed operation mode of each of the memory system 1 and the host apparatus 100. For example, the clock generator 3 sets the value of the high-speed operation mode flag to a nonactive value "0" based on the detection result. The clock generator 3 stops supplying the high-speed clock signal REFCLK to each of the memory system 1 and the host apparatus 100 during a period when the high-speed operation mode is disabled. Therefore, the transmitting and receiving of the signal through the PCIe interface 4 is performed in synchronization with a low-speed clock signal (for example, the suspend clock signal SUSCLK).

It should be noted that, although FIG. 2 illustrates that the clock generator 3 is provided on the outside of the host apparatus 100, the clock generator 3 may be provided in the host apparatus 100.

The wakeup signal PEWAKE# is a signal to be transmitted from the host apparatus 100 to the memory system 1 when the host apparatus 100 activates the memory system 1.

The reset signal PERST# is a signal to be transmitted from the host apparatus 100 to the memory system 1 when the host apparatus 100 initializes the memory system 1.

The suspend clock signal SUSCLK is a signal to be transmitted from the host apparatus 100 to the memory system 1 when the host apparatus 100 operates the memory system 1 in a low-power consumption operation.

These control signals are determined as open drain signals corresponding to the first power source level VDD1 according to the PCIe standard (for example, the driving voltage of the circuit is 3.3 V).

For example, a potential of the communication line CL1 transferring the clock request signal CLKREQ# or the wakeup signal PEWAKE# is pulled up to the first power source level (for example, 3.3 V) VDD1 in the host apparatus 100 according to the PCIe standard. Alternatively, for example, a potential of the communication line CL2 transferring the reset signal PERST# or the suspend clock signal SUSCLK is pulled up to the first power source level (for example, 3.3 V) VDD1 in the memory system 1 according to the PCIe standard.

For example, in the memory system 1 illustrated in FIG. 2, a case where the ports UP1 and UP2 of the memory system 1 are connected to the signal terminals ST1 and ST2 of the controller 70 will be considered. In this case, since the first power source level (for example, 3.3 V) VDD1 exceeds a maximum rated voltage of the I/O circuits 71 and 72, when the first power source level is input to the I/O circuits 71 and 72, the I/O circuits 71 and 72 may be broken down.

Further, the clock request signal CLKREQ# and the wakeup signal PEWAKE# are made of the wired-OR connection with a plurality of memory systems 1-1 to 1-3. For example, when a power source of the memory system 1-1 is turned off and power sources of other memory systems 1-2, 1-3 are turned on, a power source of the host apparatus 100 is turned on in order to access the other memory systems 1-2, 1-3. In a case where a power source of the memory system 1-1 is turned off and a power source of the host apparatus 100 is turned on, the communication line CL1 enters a state in which the potential thereof is pulled up to the first power source level (for example, 3.3 V) VDD1 in the host apparatus 100. Therefore, even when the power source of the memory system 1-1 is turned off, since the first power source level VDD1 is applied to the I/O circuit 71 of the controller 70 through the port UP1, a signal line SL1, and the signal terminal ST1, the I/O circuit 71 may be broken down.

Then, in the first embodiment, an interface circuit which performs the level conversion between the first power source level VDD1 and the second power source level VDD2 is provided between the port of the memory system 1 and the signal terminal of the controller 70, so that the breakdown of the controller 70 can be prevented.

Specifically, as illustrated in FIG. 2, the memory system 1 further includes a plurality of interface circuits 11 and 12. In other words, in the memory system 1, the plurality of ports UP1 and UP2 are provided corresponding to a plurality of control signals, and a plurality of signal terminals ST1 and ST2 are provided in the controller 70 corresponding to the plurality of ports UP1 and UP2. Then, the interface circuits 11 and 12 are inserted between the respective ports UP1 and UP2 and the corresponding signal terminals ST1 and ST2.

The interface circuit 11 is connected to the host apparatus 100 through the signal line (a first signal line) SL1, the port UP1, and the communication line CL1. A potential of the signal line SL1 can be pulled up to the first power source level VDD1, in a case where the signal line SL1 is electrically connected to the host apparatus 100. A potential of the signal line SL1 can be pulled up to the first power source level VDD1 by a pull-up portion 101 in the host apparatus 100. The pull-up portion 101 includes a resistive element R2 serving as a pull-up resistor. One end of the resistive element R2 is connected to the first power source level VDD1, and the other end is connected to a signal line SL101 in the host apparatus 100.

The interface circuit 11 is connected to the signal terminal ST1 of the controller 70 through a signal line (a second signal line) SL2. A potential of the signal line SL2 can be pulled up to the second power source level VDD2 by the interface circuit 11, in a case where the signal line SL2 is electrically connected to the host apparatus 100. The interface circuit 11 includes a resistive element R1 serving as a pull-up resistor. The details of the resistive element R1 will be described below. The second power source level VDD2 is lower than the first power source level VDD1. The core unit 73 of the controller 70 is connected to the signal terminal ST1 through the I/O circuit 71. The I/O circuit 71 includes a driver 71a and a receiver 71b. The driver 71a serves as an output circuit of an open drain type in cooperation with the resistive element R1 (the pull-up resistor). The receiver 71b is an input circuit of an inverter type.

It should be noted that, the driver 71a, for example, includes an NMOS transistor of which the source is connected to the ground potential (0 V), the drain is connected to the signal terminal ST1, and the gate is connected to the core unit 73. The driver 71a (the NMOS transistor) is turned on when a signal at a high level (hereinafter, referred to as an H level) is supplied to the input terminal (gate), and brings the output terminal (drain) to the low level (hereinafter, referred to as an L level). Therefore, the signal terminal ST1 is brought to the L level. The driver 71a (the NMOS transistor) is turned off when a signal at the L level is supplied to the input terminal (gate), and brings the output terminal (drain) into high impedance. Therefore, the signal terminal ST1 is brought into high impedance.

Similarly, a controller 102 of the host apparatus 100 includes a driver 171a containing the NMOS transistor of which the source is connected to the ground potential (0 V), the drain is connected to the signal terminal ST101, and the gate is connected to the core unit 173 of the controller. The signal terminal ST101 is connected to the port DP1 through the signal line SL101. The driver 171a (the NMOS transistor) is turned on when a signal at the H level is supplied to the input terminal (gate), and brings the output terminal (drain) to the L level. Therefore, the signal terminal ST101 is brought to the L level. The driver 171a (the NMOS transistor) is turned off when a signal at the L level is supplied to the input terminal (gate), and brings the output terminal (drain) into high impedance. Therefore, the signal terminal ST101 is brought into high impedance.

The interface circuit 11 is configured to bidirectionally transmit a signal between the host apparatus 100 and the controller 70. When transmitting a signal, the interface circuit, 11 performs the level conversion between the first power source level VDD1 of the signal received from the host apparatus 100 and the second power source level VDD2 of the driving voltage of the controller 70.

For example, the interface circuit 11 performs the level conversion when an interface operation is performed on the control signals (for example, the clock request signal CLKREQ# and the wakeup signal PEWAKE#) bidirectionally transmitted/received between the memory system 1 and the host apparatus 100. The clock request signal CLKREQ# and the wakeup signal PEWAKE# both are the open drain signals according to the PCIe standard.

The clock request signal CLKREQ# is a low active signal, descends to the L level when the supply of the high-speed clock REFCLK is requested, and is brought into high impedance or ascends to the H level when the supply of the high-speed clock signal REFCLK is not requested. It should be noted that the high-speed clock signal REFCLK may be generated by the clock generator 3 and may be supplied to each of the core unit 73 of the controller 70 of the memory system 1 and the controller 102 of the host apparatus 100. Therefore, the core unit 73 of the controller 70 and the controller 102 of the host apparatus 100 each can operate in synchronization with the high-speed clock signal REFCLK.

The wakeup signal PEWAKE# is the low active signal. When the host apparatus 100 is going to activate the memory system 1, the wakeup signal PEWAKE# at the L level is transmitted from the host apparatus 100 to the memory system 1. When completing a wakeup operation, the memory system 1 informs of the fact by transmitting the wakeup signal PEWAKE# at the L level from the memory system 1 to the host apparatus 100.

Further, the second power source level VDD2 is deactivated when the power source of the controller 70 is turned off. During a period when the second power source level VDD2 is deactivated, the interface circuit 11 is configured to electrically disconnect the host apparatus 100 from the controller 70.

For example, when a power source of the memory system 1-1 is turned off and power sources of other memory systems 1-2, 1-3 are turned on, a power source of the host apparatus 100 is turned on in order to access the other memory systems 1-2, 1-3. In a case where a power source of the memory system 1-1 is turned off and a power source of the host apparatus 100 is turned on, the communication line CL1 enters a state in which the potential thereof is pulled up to the first power source level (for example, 3.3 V) VDD1 in the host apparatus 100. Even in this case, since the interface circuit 11 electrically disconnects the host apparatus 100 from the controller 70, the application of the first power source level VDD1 to the controller 70 can be avoided.

It should be noted that, in a case where there are a plurality of signals to be bidirectionally transmitted or received between the memory system 1 and the host apparatus 100, the interface circuit 11 is provided for each of the plurality of signals. In FIG. 2, one interface circuit 11 is illustrated to simplify the drawing and the description.

Specifically, the interface circuit 11 includes a field effect transistor NM1 and the resistive element R1.

The field effect transistor NM1 is inserted between the signal line SL2 and the signal line SL1. The field effect transistor NM1, for example, is the NMOS transistor of which the source is connected to the signal line SL2 and the drain is connected to the signal line SL1. The field effect transistor NM1 includes a parasitic diode (rectifying element, parasitic rectifying element) D1 and a gate protection diode GD1. The anode of the parasitic diode D1 is connected to the source of the field effect transistor NM1, and the cathode is connected to the drain of the field effect transistor NM1. One end of the gate protection diode GD1 is connected to the gate of the field effect transistor NM1, and the other end is connected to the source of the field effect transistor NM1.

The resistive element R1 is inserted between the signal line SL2, the source of the field effect transistor NM1, the second power source level VDD2, and the gate of the field effect transistor NM1. One end of the resistive element R1 is connected to each of the second power source level VDD2 and the gate of the field effect transistor NM1, and the other end is connected to each of the signal line SL2 and the source of the field effect transistor NM1. The resistive element R1 serves as a pull-up resistor which pulls up the potential of the signal line SL2, and also serves as a resistor which adjusts the potential of the gate of the field effect transistor NM1 according to the potential of the signal line SL2. Even when an input leakage current flows into the resistive element R1 to cause a voltage drop, the resistance of the resistive element R1 is set to be small enough for the potential of the signal line SL2 to fall within a range of the H level.

The potential of the gate of the field effect transistor NM1 is adjusted by the resistive element R1, and as a result the field effect transistor NM1 is turned off when the signal line SL2 is at a potential (the H level) according to the second power source level VDD2. The field effect transistor NM1 is turned on when the signal line SL2 is at a potential (the L level) according to a reference level. For example, the field effect transistor NM1 has a threshold voltage Vth smaller than a difference between a minimum value of the second power source level VDD2 and a maximum value of the L level of the signal line SL2. For example, there is considered a case where a voltage range from 1.62 V to 1.98 V is allowed for the second power source level VDD2 (the H level of the signal line SL2) of which the reference value is 1.8 V, and a voltage range from 0 V to 0.4 V is allowed for the L level of the signal line SL2. In this case, since the minimum value of the second power source level VDD2 is 1.62 V, the maximum value of the L level of the signal line SL2 is 0.4 V, the following Equation 1 is satisfied.

$$Vth < 1.62\ V - 0.4\ V = 1.22\ V \qquad \text{Equation 1}$$

The operation of the interface circuit 11 will be described. The interface circuit 11 is configured to bidirectionally transmit a signal between the host apparatus 100 and the controller 70.

First, a case where a signal transmission from the memory system 1 to the host apparatus 100 will be described.

In a case where a signal at the H level is transmitted to the host apparatus 100, the core unit 73 of the memory system 1 sets the I/O circuit 71 to an output mode. In a case where the I/O circuit 71 is set to the output mode, the core unit 73 of the memory system 1 does not receive the input from the receiver 71b. Then, the core unit 73 of the memory system 1 turns off the driver 71a (the NMOS transistor), and brings the potential of the signal terminal ST1 into high impedance. When the potential of the signal terminal ST1 is brought into high impedance, the potential of the signal line SL2 is pulled up to the H level (1.8 V) through the pull-up resistor (the resistive element R1). When the signal (that is, the potential of the signal line SL2) in the memory system 1 is at the H level (1.8 V), a gate-source voltage VGS of the field effect transistor NM1 becomes about 0 V. Therefore, the field effect transistor NM1 is turned off, the drain of the field effect transistor NM1 becomes open (high impedance).

At this time, when the signal terminal ST101 of the host apparatus 100 is brought to the L level, a current flows into the resistive element R2 to cause a voltage drop in the resistive element R2, so that the potentials of the signal line SL1, the communication line CL1, and the signal line SL101 descend to the L level. Therefore, the signal at the H level (1.8 V) in the memory system 1 is not transmitted to the host apparatus 100.

On the other hand, when the signal terminal ST101 of the host apparatus 100 is brought into high impedance, the pulling-up by the resistive element R2 in the host apparatus 100 becomes effective, so that the potentials of the signal line SL1, the communication line CL1, and the signal line SL101 are pulled up to the H level (3.3 V). Therefore, the signal at the H level (1.8 V) in the memory system 1 is level-converted into the signal at the H level (3.3 V) in the host apparatus 100 and transmitted to the host apparatus 100.

In a case where the signal at the L level is transmitted to the host apparatus 100, the core unit 73 of the memory system 1 sets the I/O circuit 71 to the output mode. Then, the core unit 73 of the memory system 1 turns on the driver 71a (the NMOS transistor), and brings the signal terminal ST1 to the L level (0 V). When the signal terminal ST1 is brought to the L level, the current flows into the pull-up resistor (the resistive element R1) to cause a voltage drop, and the potential of the signal line SL2 descends to the L level (0 V) by the voltage drop. When the signal (that is, the potential of the signal line SL2) in the memory system 1 is at the L level (0 V), since the gate-source voltage VGS of the field effect transistor NM1 becomes about 1.8 V by the operation of the resistive element R1 and exceeds the threshold voltage Vth, the field effect transistor NM1 is turned on. Then, the potentials of the signal line SL1, the communication line CL1, and the signal line SL101 also descend to the L level (0 V). In other words, the signal at the L level (0 V) in the memory system 1 is level-converted into the signal at the L level (0 V) in the host apparatus 100 and transmitted to the host apparatus 100.

Next, a case where a signal transmission from the host apparatus 100 to the memory system 1 will be described.

In a case where the signal at the H level is transmitted to the memory system 1, a core unit 173 of the host apparatus 100 turns off the driver 171a (the NMOS transistor), and brings the signal terminal ST101 into high impedance.

At this time, when the signal terminal ST1 is brought to the L level, since the current flows into the resistive element R1 to cause a voltage drop in the resistive element R1, the potential of the signal line SL2 descends to the L level. Then, since the gate-source voltage VGS of the field effect transistor NM1 becomes about 1.8 V by the operation of the resistive element R1 and exceeds the threshold voltage Vth, the field effect transistor NM1 is turned on. Then, since the current flows into the resistive element R2 to cause a voltage drop in the resistive element R2, the potentials of the signal line SL1, the communication line CL1, and the signal line SL101 descend to the L level. Therefore, the signal at the H level (3.3 V) in the host apparatus 100 is not generated. It should be noted that a case where the signal terminal ST1 is bought to the L level, for example, includes a case where the core unit 73 of the memory system 1 sets the I/O circuit 71 to the output mode and turns on the driver 71a (the NMOS transistor).

On the other hand, when the signal terminal ST1 is brought into high impedance, the potential of the signal line SL2 is pulled up to the H level (1.8 V) by the operation of the resistive element R1, and the field effect transistor NM1 enters an off state. In other words, the drain of the field effect transistor NM1 becomes open (high impedance). Therefore, when the signal terminal ST101 is brought into high impedance, the potential of the signal line SL101 is pulled up to the H level (3.3 V) through the pull-up resistor (the resistive element R2). Accordingly, the potential of the H level (3.3 V) is transferred to the signal line SL1 through the port DP1, the signal line CL1, and the port UP1. When the potential of the signal line SL1 ascends to the H level, the parasitic diode D1 of the field effect transistor NM1 is turned off and thus the field effect transistor NM1 is kept in the off state. Therefore, the potential of the signal line SL2 is kept at the H level (1.8 V). In other words, the signal at the H level (3.3 V) in the host apparatus 100 is level-converted into the signal at the H level (1.8 V) in the memory system 1 and transmitted to the controller 70. It should be noted that a case where the signal terminal ST1 is brought into high impedance, for example, includes a case where the core unit 73 of the memory system 1 sets the I/O circuit 71 in the output mode to turn off the driver 71a (the NMOS transistor). Alternatively, for example, the core unit 73 of the memory system 1 may set the I/O circuit 71 in the input mode. In a case where the I/O circuit 71 is set to the input mode, the core unit 73 of the memory system 1 keeps the driver 71a (the NMOS transistor) in the off state.

In a case where the signal at the L level is transmitted to the memory system 1, the host apparatus 100 turns on the driver 171a (the NMOS transistor), and brings the potential of the signal line SL101 to the L level (0 V). Therefore, the potential of the L level (0 V) is transferred to the signal line SL1 through the port DP1, the signal line CL1, and the port UP1. When the potential of the signal line SL1 descends to the L level, the parasitic diode D1 of the field effect transistor NM1 is turned on and thus the potential of the source of the field effect transistor NM1 also descends to the L level. Since the gate-source voltage VGS of the field effect transistor NM1 becomes about 1.8 V by the operation of the resistive element R1 and exceeds the threshold voltage Vth, the field effect transistor NM1 is turned on. Then, the potential of the signal line SL2 also descends to the L level (0 V). In other words, the signal at the L level (0 V) in the host apparatus 100 is level-converted into the signal at the L level (0 V) in the memory system 1 and transmitted to the controller 70.

Further, in a case where the memory system 1 is powered off and the host apparatus 100 is powered on, the second power source level VDD2 connected to one end of the pull-up resistor (the resistive element R1) in the memory system 1 is deactivated. Therefore, since the field effect transistor NM1 in the memory system 1 enters the off state and the voltage of the gate also becomes 0 V, even in a case where the signal is controlled in the host apparatus 100, it is possible to prevent that the voltage is applied to the controller 70 of the memory system 1.

The interface circuit 12 is connected to the host apparatus 100 through a signal line (the first signal line) SL11, the port UP2, and the communication line CL2. A potential of the signal line SL11 can be pulled up to the first power source level VDD1. A potential of the signal line SL11 can be pulled up to the first power source level VDD1 by a pull-up portion 13 in the memory system 1. The pull-up portion 13 includes a resistive element R12. One end of the resistive element R12 is connected to the first power source level VDD1, and the other end is connected to the signal line SL11.

The interface circuit 12 is connected to the signal terminal ST2 of the controller 70 through a signal line (the second signal line) SL12. A potential of the signal line SL12 can be pulled up to the second power source level VDD2 by the interface circuit 12. The second power source level VDD2 is lower than the first power source level VDD1. The core unit 73 of the controller 70 is connected to the signal terminal ST2 through the I/O circuit 72. The I/O circuit 72 includes a receiver 72b. The receiver 72b is an input circuit of the inverter type.

The interface circuit 12 is configured to bidirectionally transmit a signal between the host apparatus 100 and the controller 70. When transmitting the signal, the interface circuit 12 performs the level conversion between the first power source level VDD1 in the host apparatus 100 and the second power source level VDD2 in the controller 70.

For example, the interface circuit 12 performs the level conversion when an interface operation is performed on the control signals (for example, the reset signal PERST# and the suspend clock signal SUSCLK) received by the memory system 1 from the host apparatus 100. The reset signal PERST# and the suspend clock signal SUSCLK both are the signals according to the PCIe standard.

The reset signal PERST# is the low active signal. When the host apparatus 100 initializes the memory system 1 (for example, when the host apparatus 100 is completely prepared and the host apparatus 100 starts to use the memory system 1), the reset signal PERST# at the L level is transmitted from the host apparatus 100 to the memory system 1.

The suspend clock signal SUSCLK is the low-speed clock signal. The transmitting and receiving of the signal through the PCIe interface 4 is basically performed in synchronization with the high-speed clock signal REFCLK. In such a case where a high-speed operation is not necessarily, the transmitting and receiving of the signal through the PCIe interface 4 is temporarily performed in synchronization with the suspend clock signal SUSCLK. For example, when the host apparatus 100 causes the memory system 1 to perform the low-power consumption operation, the suspend clock signal SUSCLK is transmitted from the host apparatus 100 to the memory system 1. It should be noted that the suspend clock signal SUSCLK may be generated by a clock generator 102a in the controller 102 of the host apparatus 100.

It should be noted that, in a case where the memory system 1 receives a plurality of signals from the host apparatus 100, the interface circuit 12 is provided as many as the plurality of signals. In FIG. 2, one interface circuit 12 is illustrated to simplify the drawing and the description.

Specifically, the interface circuit 12 includes a field effect transistor NM11 and the resistive element R11.

The field effect transistor NM11 is inserted between the signal line SL12 and the signal line SL11. The field effect transistor NM11, for example, is the NMOS transistor of which the source is connected to the signal line SL12 and the drain is connected to the signal line SL11. The field effect transistor NM11 includes a parasitic diode D11 and a gate protection diode GD11. The anode of the parasitic diode D11 is connected to the source of the field effect transistor NM11, and the cathode is connected to the drain of the field effect transistor NM11. One end of the gate protection diode GD11 is connected to the gate of the field effect transistor NM11, and the other end is connected to the source of the field effect transistor NM11.

The resistive element R11 is inserted between the signal line SL12, the source of the field effect transistor NM11, the second power source level VDD2, and the gate of the field effect transistor NM11. One end of the resistive element R11 is connected to each of the second power source level VDD2 and the gate of the field effect transistor NM11, and the other end is connected to each of the signal line SL12 and the source of the field effect transistor NM11. The resistive element R11 serves as a pull-up resistor which pulls up the potential of the signal line SL12, and also serves as a resistor which adjusts the potential of the gate of the field effect transistor NM11 according to the potential of the signal line SL12. Even when an input leakage current flows into the resistive element R11 to cause a voltage drop, the resistance of the resistive element R11 is set to be small enough for the potential of the signal line SL12 to fall within a range of the H level.

The potential of the gate of the field effect transistor NM11 is adjusted by the resistive element R11, and as a result the field effect transistor NM11 is turned off when the signal line SL12 has a potential (the H level) according to the second power source level VDD2. The field effect transistor NM11 is turned on when the signal line SL12 has a potential (the L level) according to the reference level. For example, the field effect transistor NM11 has a threshold voltage Vth' smaller than a difference between a minimum value of the second power source level VDD2 and a maximum value of the L level of the signal line SL12. For example, there is considered a case where a voltage range from 1.62 V to 1.98 V is allowed for the second power source level VDD2 (the H level of the signal line SL2) of which the reference value is 1.8 V, and a voltage range from 0 V to 0.4 V is allowed for the L level of the signal line SL2. In this case, since the minimum value of the second power source level VDD2 is 1.62 V, the maximum value of the L level of the signal line SL12 is 0.4 V, the following Equation 2 is satisfied.

$$Vth' < 1.62\ V - 0.4\ V = 1.22\ V \qquad \text{Equation 2}$$

The operation of the interface circuit 12 will be described. The interface circuit 12 is configured to bidirectionally transmit a signal between the host apparatus 100 and the controller 70, and is used in the signal transmission from the host apparatus 100 to the memory system 1.

In a case where the signal at the H level is transmitted to the memory system 1, a core unit 173 of the host apparatus 100 turns off the driver 171a (the NMOS transistor), and brings the signal terminal ST101 into high impedance.

At this time, since the I/O circuit 72 of the memory system 1 includes the receiver 72b of the inverter type without a driver, the signal terminal ST2 is normally brought into high impedance. The potential of the signal line SL12 is pulled up to the H level (1.8 V), and the field effect transistor NM11 enters the off state. In other words, the drain of the field effect transistor NM11 becomes open (high impedance). Therefore, when the signal terminal connected to the port DP2 in the controller 102 is brought into high impedance, the potential of the signal line SL11 is pulled up to the H level (3.3 V) through the pull-up resistor (the resistive element R12). When the potential of the signal line SL11 ascends to the H level, the parasitic diode D11 of the field effect transistor NM11 is turned off and thus the field effect transistor NM11 is kept in the off state. Therefore, the potential of the signal line SL12 is kept at the H level (high impedance). In other words, the signal at the H level (3.3 V) in the host apparatus 100 is level-converted into the signal at the H level (1.8 V) in the memory system 1 and transmitted to the controller 70.

In a case where the signal at the L level is transmitted to the memory system 1, the host apparatus 100 turns on the driver 171a (the NMOS transistor), and brings the potential of the signal line SL11 between the port DP2 and the controller 102 to the L level (0 V). Therefore, the potential of the L level (0 V) is transferred to the signal line SL11 through the port DP2, the signal line CL2, and the port UP2. When the potential of the signal line SL11 descends to the L level, the parasitic diode D11 of the field effect transistor NM11 is turned on and thus the potential of the source of the field effect transistor NM11 also descends to the L level. Since the gate-source voltage VGS of the field effect transistor NM11 becomes about 1.8 V by the operation of the resistive element R1 and exceeds the threshold voltage Vth, the field effect transistor NM11 is turned on. Then, the potential of the signal line SL12 also descends to the L level (0 V). In other words, the signal at the L level (0 V) in the host apparatus 100 is level-converted into the signal at the L level (0 V) in the memory system 1 and transmitted to the controller 70.

Figure 3:
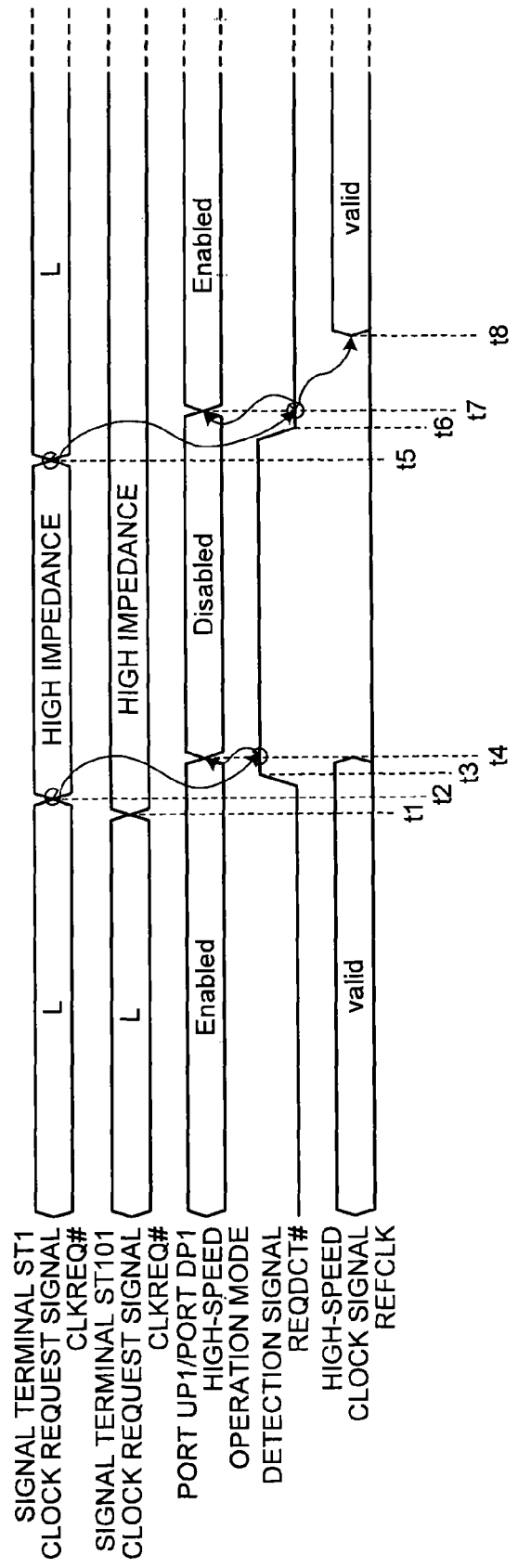
FIG. 3 is a waveform diagram illustrating an operation of the memory system according to the first embodiment.
Figure 4:
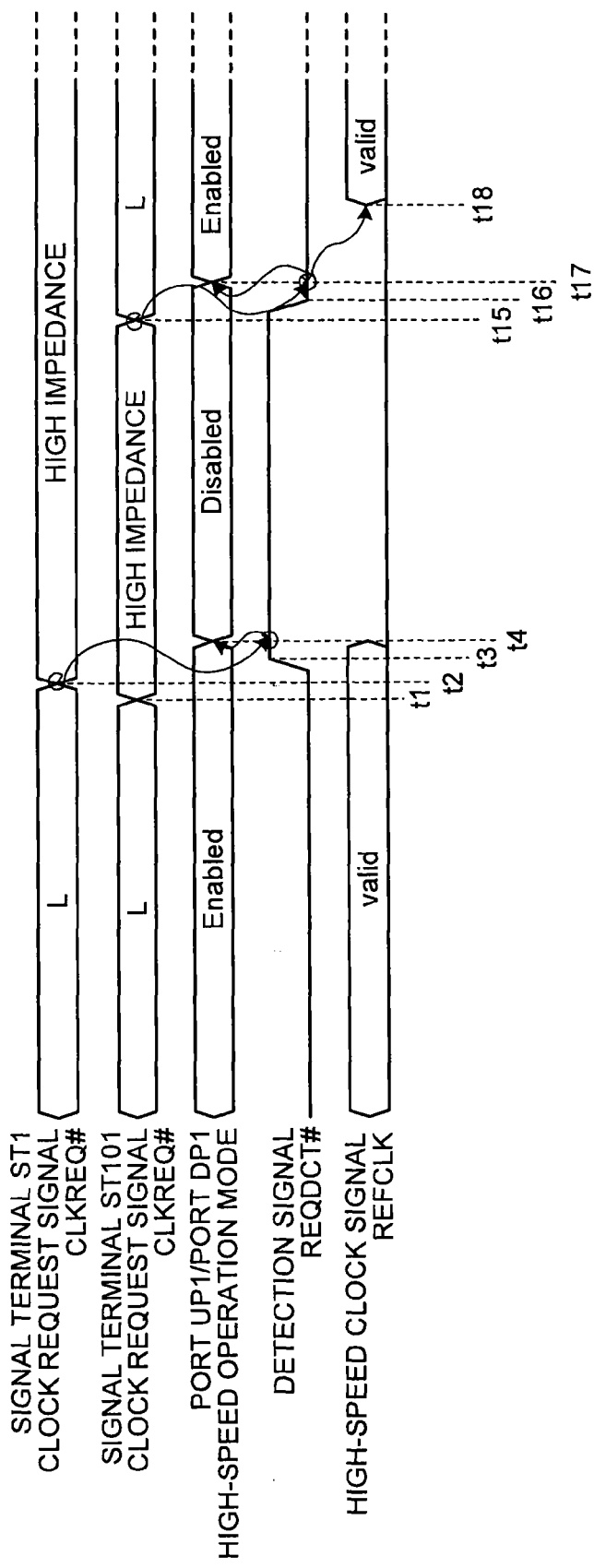
FIG. 4 is a waveform diagram illustrating an operation of the memory system according to the first embodiment.

Next, the operation of the memory system 1 will be described using FIGS. 3 and 4. FIGS. 3 and 4 are diagrams each illustrating the operations of the memory system 1 related to the clock request signal CLKREQ#.

In FIG. 3, a case where the high-speed operation mode is recovered from a disable to an enable state according to a request of the memory system 1 is illustrated.

In FIG. 3, "Signal Terminal ST1/Clock Request Signal CLKREQ#" indicates the clock request signal CLKREQ# output from the signal terminal ST1 of the memory system 1. "L" indicates that the signal terminal ST1 is brought to the L level. The "high impedance" indicates that the signal terminal ST1 is brought into high impedance.

"Signal Terminal ST101/Clock Request Signal CLKREQ#" indicates the clock request signal CLKREQ# output from the signal terminal ST101 of the host apparatus 100. "L" indicates that the signal terminal ST101 is brought to the L level. The "high impedance" indicates that the signal terminal ST101 is brought into high impedance.

It should be noted that the clock request signal CLKREQ# is a low active signal, descends to the L level when the supply of the high-speed clock REFCLK is requested, and is brought into high impedance or ascends to the H level when the supply of the high-speed clock signal REFCLK is not requested. Further, the clock request signal CLKREQ# is a signal to request for the supply of a high-speed clock signal REFCLK from a clock generator 3. When the high-speed clock signal REFCLK is requested for the clock generator 3, the L level of the clock request signal CLKREQ# output from the signal terminals ST1 and ST101 is reflected on the level of the clock request signal CLKREQ# of the communication line CL1 monitored by the clock generator 3. For example, in a case where at least one of the clock request signal CLKREQ# output from the signal terminal ST1 of the memory system 1 and the clock request signal CLKREQ# output from the signal terminal ST101 of the host apparatus 100 is at the L level (request for the supply), the level of the clock request signal CLKREQ# appearing in the communication line CL descends to the L level (request for the supply). In a case both of the clock request signal CLKREQ# output from the signal terminal ST1 of the memory system 1 and the clock request signal CLKREQ# output from the signal terminal ST101 of the host apparatus 100 are brought into high impedance (request for stopping the supply), the level of the clock request signal CLKREQ# appearing in the communication line CL ascends to the H level (request for stopping the supply).

The "high-speed operation mode" indicates a state of the high-speed operation mode relating to the transmitting and receiving of the signal through the ports UP1 and DP1. In other words, the high-speed operation mode is enabled during a period indicated by "Enabled", and the high-speed operation mode is disabled during a period indicated by "Disabled". The high-speed operation mode is controlled by the clock generator 3 based on the level of a "detection signal REQDCT#".

The "detection signal REQDCT#" is a signal indicating a result on that the clock generator 3 detects whether both of the memory system 1 and the host apparatus 100 do not request for the supply of the high-speed clock signal REFCLK. The "detection signal REQDCT#" is a signal indicating a result on that the level of the clock request signal CLKREQ# appearing in the communication line CL1 is detected. The "detection signal REQDCT#" descends to the L level in a case where at least one of the memory system 1 and the host apparatus 100 requests for the supply of the high-speed clock signal REFCLK. The "detection signal REQDCT#" ascends to the H level in a case where both of the memory system 1 and the host apparatus 100 do not request for the supply of the high-speed clock signal REFCLK.

The "high-speed clock signal REFCLK" indicates a supplying state of the high-speed clock signal REFCLK. In other words, the high-speed clock signal REFCLK is supplied from the clock generator 3 to the memory system 1 and the host apparatus 100 during a period indicated by "valid".

At timing t1, the host apparatus 100 brings the signal terminal ST101 into high impedance in order to request for stopping the supply of the high-speed clock signal REFCLK. In other words, the core unit 173 of the host apparatus 100 supplies an internal clock request signal at the L level to the gate of the driver 171a (the NMOS transistor) to turn off the driver 171a. Therefore, the signal terminal ST101 is brought into high impedance. At this time, since the signal terminal ST1 is brought to the L level, the clock request signal CLKREQ# at the L level appears in the communication line CL1, and the "detection signal REQDCT#" is kept at the L level.

Herein, when the core unit 73 of the memory system 1 sets the I/O circuit 71 in the input mode, the clock request signal CLKREQ# at the L level appearing in the communication line CL1 is transferred to the interface circuit 11 through the port UP1 and the communication line SL1. In the interface circuit 11, the potential of the source of the field effect transistor NM1 also descends to the L level by turning on the parasitic diode D1 of the field effect transistor NM1. Since the gate-source voltage VGS of the field effect transistor NM1 becomes about 1.8 V by the operation of the resistive element R1 and exceeds the threshold voltage Vth, the field effect transistor NM1 is turned on. Then, the potential of the L level is transferred from the communication line SL1 to the signal terminal ST1 through the interface circuit 11 and the communication line SL2. The clock request signal CLKREQ# transferred to the signal terminal ST1 is transmitted to the core unit 73 through the receiver 71b. Therefore, the core unit 73 of the controller 70 can recognize that the level of the clock request signal CLKREQ# appearing in the communication line CL1 descends to the L level and the high-speed operation mode is enabled.

At timing t2, the memory system 1 brings the signal terminal ST1 into high impedance in order to request for stopping the supply of the high-speed clock signal REFCLK. In other words, the core unit 73 of the memory system 1 sets the I/O circuit 71 in the output mode. The core unit 73 of the memory system 1 supplies the internal clock request signal at the L level to the gate of the driver 71a (the NMOS transistor) to turn off the driver 71a (the NMOS transistor), and brings the signal terminal ST1 into high impedance. The high impedance is transferred to the interface circuit 11 through the signal line SL1. In the interface circuit 11, since the gate-source voltage VGS of the field effect transistor NM1 becomes about 0 V by the operation of the resistive element R1, the field effect transistor NM1 is turned off, and the drain of the field effect transistor NM1 becomes open (high impedance). In other words, the drain of the field effect transistor NM1 becomes open (high impedance) by bringing the signal terminal ST1 into high impedance.

At timing t3, since both of the clock request signal CLKREQ# output from the signal terminal ST1 of the memory system 1 and the clock request signal CLKREQ# output from the signal terminal ST101 of the host apparatus 100 are brought into high impedance. A potential of the signal line SL101 is pulled up to the H level (3.3 V) by the pull-up resistor (the resistive element R2). The H level (3.3 V) is transferred to the communication line CL1 through the port DP1, and the clock request signal CLKREQ# at the H level (3.3 V) appears in the communication line CL1. The clock generator 3 detects that the clock request signal CLKREQ# at the H level (3.3 V) appears in the communication line CL1. Accordingly, the clock generator 3 deasserts the detection signal REQDCT# as an indication that the memory system 1 and the host apparatus 100 reach an agreement on stopping the supply of the high-speed clock signal REFCLK. In other words, the clock generator 3 shifts the level of the detection signal REQDCT# from the L level to the H level.

At timing t4, the clock generator 3 shifts the high-speed operation mode of the memory system 1 and the host apparatus 100 from the enable state to the disable state according to the deassertion of the detection signal REQDCT#, and stops the supply of the high-speed clock signal REFCLK. Accordingly, the memory system 1 performs a transmitting and receiving operation using the suspend clock signal SUSCLK received from the host apparatus 100.

Herein, when the core unit 73 of the memory system 1 sets the I/O circuit 71 in the input mode, the clock request signal CLKREQ# at the H level (3.3 V) appearing in the communication line CL1 is transferred to the interface circuit 11 through the port UP1 and the communication line SL1. In the interface circuit 11, the field effect transistor NM1 is kept in the off state by turning off the parasitic diode D1 of the field effect transistor NM1. Therefore, the potential of the signal line SL2 is kept at the H level (1.8 V), and the potential of the H level of the communication line SL2 is transferred to the signal terminal ST1. The clock request signal CLKREQ# at the H level transferred to the signal terminal ST1 is transmitted to the core unit 73 through the receiver 71b. In other words, the signal at the H level (3.3 V) in the host apparatus 100 is level-converted into the signal at the H level (1.8 V) in the memory system 1 and transferred to the controller 70. Therefore, the core unit 73 of the controller 70 can recognize a state in which the level of the clock request signal CLKREQ# appearing in the communication line CL1 ascends to the H level and the high-speed operation mode is disabled.

Further, the clock request signal CLKREQ# at the H level (3.3 V) appearing in the communication line CL1 is transferred to the signal terminal ST101 through the port DP1 and the communication line SL101. In other words, the signal at the H level (1.8 V) in the memory system 1 is level-converted in the memory system 1 into the signal at the H level (3.3 V) in the host apparatus 100, and transmitted from the memory system 1 to the host apparatus 100 through the communication line CL1.

At timing t5, the memory system 1 brings the signal terminal ST1 to the L level in order to request for restarting the supply of the high-speed clock signal REFCLK. In other words, the core unit 73 of the memory system 1 sets the I/O circuit 71 in the output mode. The core unit 73 of the memory system 1 supplies the internal clock request signal at the H level to the gate of the driver 71a (the NMOS transistor) to turn on the driver 71a (the NMOS transistor). Therefore, the signal terminal ST1 is brought to the L level (0 V). The potential of the L level is transferred to the interface circuit 11 through the signal line SL1. In the interface circuit 11, since the gate-source voltage VGS of the field effect transistor NM1 becomes about 1.8 V by the operation of the resistive element R1 and exceeds the threshold voltage Vth, the field effect transistor NM1 is turned on. Therefore, a current path from the resistive element R2 (the resistive element R2→the signal line SL101→the port DP1→the communication line CL1→the port UP1→the signal line SL1→the field effect transistor NM1→the signal line SL2→the signal terminal ST1→the driver 71a→the L level) is formed to be led to the L level.

At timing t6, since the current path is formed from the resistive element R2 to the L level, the current flows to the resistive element R2 and the clock request signal CLKREQ# at the L level appears in the communication line CL1. The clock generator 3 detects that the clock request signal CLKREQ# at the L level appears in the communication line CL1. Accordingly, the clock generator 3 asserts the detection signal REQDCT# as an indication that the memory system 1 and the host apparatus 100 fail to reach an agreement on stopping the supply of the high-speed clock signal REFCLK. In other words, the clock generator 3 shifts the level of the detection signal REQDCT# from the H level to the L level.

At timing t7, the clock generator 3 shifts the high-speed operation mode from the disable state to the enable state according to the assertion of the detection signal REQDCT#, and starts a preparing operation for the supply of the high-speed clock signal REFCLK.

At timing t8, the clock generator 3 completes the preparing operation for the supply of the high-speed clock signal REFCLK, and the supply of the high-speed clock signal REFCLK resumes. Accordingly, the memory system 1 is configured to perform the transmitting and receiving operation using the high-speed clock signal REFCLK.

It should be noted that, while different from the example illustrated in FIG. 3, when both the signal terminal ST101 and the signal terminal ST1 come into high impedance at timing t2, the detection signal REQDCT# is similarly deasserted at timing t3. For example, it is also the same even in a case where the signal terminal ST1 is brought into high impedance from the L level at timing t1 and the signal terminal ST101 is brought into high impedance from the L level at timing t2. Alternatively, it is also the same even in a case where one of the signal terminal ST1 and the signal terminal ST101 is kept in high impedance before timing t2 and the other one is brought into high impedance from the L level at timing t2.

Further, while different from the example illustrated in FIG. 3, when the signal terminal ST1 is brought to the L level from high impedance at timing t5, the detection signal REQDCT# is similarly asserted at timing t6. For example, it is also the same even in a case where the signal terminal ST101 is brought from high impedance to the L level after timing t5. In a case where the host apparatus 100 keeps on using the high-speed clock REFCLK even when the memory system 1 cancels the request for the supply of the high-speed clock REFCLK, the signal terminal ST101 can be kept at the L level.

In FIG. 4, a case where the high-speed operation mode is recovered from the disable state to the enable state according to the request of the host apparatus 100 is illustrated.

At timings t1 to t4, the operation similar to that in the case of FIG. 3 is performed.

At timing t15, the host apparatus 100 brings the signal terminal ST101 to the L level in order to request for resuming the supply of the high-speed clock signal REFCLK. In other words, the core unit 173 of the host apparatus 100 supplies the internal clock request signal at the H level to the gate of the driver 171a (the NMOS transistor) to turn on the driver 171a (the NMOS transistor). Therefore, the signal terminal ST101 is brought to the L level (0 V). The potential of the L level is transferred to the signal line SL101. Therefore, a current path from the resistive element R2 (the resistive element R2→the signal line SL101→the signal terminal ST101→the driver 171a→the L level) is formed to be led to the L level.

At timing t16, since the current path is formed from the resistive element R2 to the L level, the current flows to the resistive element R2 and the clock request signal CLKREQ# at the L level appears in the communication line CL1. The clock generator 3 detects that the clock request signal CLKREQ# at the L level appears in the communication line CL1. Accordingly, the clock generator 3 asserts the detection signal REQDCT# as an indication that the memory system 1 and the host apparatus 100 fail to reach an agreement on stopping the supply of the high-speed clock signal REFCLK. In other words, the clock generator 3 shifts the level of the detection signal REQDCT# from the H level to the L level.

At timing t17, the clock generator 3 shifts the high-speed operation mode from the disable state to the enable state according to the assertion of the detection signal REQDCT#, and starts the preparing operation for the supply of the high-speed clock signal REFCLK.

At timing t18, the clock generator 3 completes the preparing operation for the supply of the high-speed clock signal REFCLK, and the supply of the high-speed clock signal REFCLK resumes. Accordingly, the memory system 1 is configured to perform the transmitting and receiving operation using the high-speed clock signal REFCLK.

It should be noted that, while different from the example illustrated in FIG. 4, when the signal terminal ST101 comes to the L level from high impedance at timing t15, the detection signal REQDCT# is similarly asserted at timing t16. For example, it is also the same even in a case where the signal terminal ST1 is brought to the L level from high impedance after timing t15. In a case where the host apparatus 100 keeps on using the high-speed clock REFCLK even when the request for the supply of the high-speed clock REFCLK is canceled, the memory system 1 can keep the signal terminal ST1 at the L level.

As described above, according to the first embodiment, in the memory system 1, the interface circuits 11 and 12 perform the level conversion on the signal received from the host apparatus 100 between the first power source level VDD1 and the second power source level VDD2 (<VDD1) which is the driving voltage of the controller 70. Therefore, the levels of the control signals input to the I/O circuits 71 and 72 of the controller 70 can be set to be equal to or lower than the maximum rated voltage of the I/O circuits 71 and 72, and the breakdown of the I/O circuits 71 and 72 can be prevented. In other words, in a case where the circuit elements of the controller 70 are miniaturized, the breakdown of the controller 70 can be prevented.

Further, according to the first embodiment, in the memory system 1, the interface circuits 11 and 12 include the field effect transistors NM1 and NM11. The field effect transistors NM1 and NM11 are turned off when the signal lines SL2 and SL12 are at the potential (the H level) according to the second power source level VDD2, and turned on when the signal lines SL2 and SL12 are at the potential (the L level) according to the reference level. Therefore, in the interface circuits 11 and 12, the level conversion can be performed between the first power source level VDD1 in the host apparatus 100 and the second power source level VDD2 (<VDD1) in the controller 70.

Further, according to the first embodiment, in the memory system 1, the second power source level VDD2 supplied to the interface circuits 11 and 12 is deactivated when the power source of the controller 70 is turned off. The interface circuits 11 and 12 are configured to electrically disconnect the host apparatus 100 from the controller 70 when the second power source level VDD2 is deactivated. Therefore, when the power source of the memory system 1 is turned off, the power can be prevented from being applied to the I/O circuits 71 and 72 at the first power source level VDD1.

For example, when a power source of the memory system 1-1 is turned off and power sources of other memory systems 1-2, 1-3 are turned on, a power source of the host apparatus 100 is turned on in order to access the other memory systems 1-2, 1-3. In a case where a power source of the memory system 1-1 is turned off and a power source of the host apparatus 100 is turned on, the communication line CL1 enters a state in which the potential thereof is pulled up to the first power source level (for example, 3.3 V) VDD1 in the host apparatus 100. Even in this case, since the interface circuit 11 electrically disconnects the host apparatus 100 from the controller 70, the application of the first power source level VDD1 to the controller 70 can be avoided.

Further, according to the first embodiment, in the memory system 1, the interface circuits 11 and 12 include the field effect transistors NM1 and NM11. The field effect transistors NM1 and NM11 are turned off according to the deactivation of the second power source level VDD2. Therefore, when the second power source level VDD2 is deactivated, it is possible to electrically disconnect the host apparatus 100 from the controller 70.

Further, according to the first embodiment, in the memory system 1, the interface circuits 11 and 12 are configured to bidirectionally transmit the signal between the host apparatus 100 and the controller 70. Therefore, since the ports can be commonly used for the transmission and the reception, the number of ports in the interface 4 between the host apparatus 100 and the controller 70 can be reduced, and the cost for the system including the memory system 1, the interface 4, and the host apparatus 100 can be reduced.

Further, according to the first embodiment, in the memory system 1, the interface circuits 11 and 12 transmit the signal transmitted from the controller 70 to the host apparatus 100 using the field effect transistors NM1 and NM11. The interface circuits 11 and 12 transmit the signal received from the host apparatus 100 to the controller 70 using the parasitic diodes D1 and D11 of the field effect transistors NM1 and NM11. Therefore, the interface circuits 11 and 12 can bidirectionally transmit the signal between the host apparatus 100 and the controller 70 using the field effect transistors NM1 and NM11, respectively.

Further, according to the first embodiment, in the memory system 1, the interface circuits 11 and 12 include the resistive elements R1 and R11. One ends of the resistive elements R1 and R11 are respectively connected to the second power source level VDD2 and the gates of the field effect transistors NM1 and NM11, and the other ends are respectively connected to the signal lines SL2 and SL12 and the sources of the transistors. Therefore, the field effect transistors NM1 and NM11 can be turned off when the signal lines SL2 and SL12 are at the potential (the H level) according to the second power source level VDD2, and turned on when the signal lines SL2 and SL12 are at the potential (the L level) according to the reference level. Further, the field effect transistors NM1 and NM11 can be turned off according to the deactivation of the second power source level VDD2.

Second Embodiment

Next, a memory system 201 will be described according to a second embodiment. In the following, the description will be made focusing on portions different from the first embodiment.

In the first embodiment, the interface circuits 11 and 12 are configured using the field effect transistors NM1 and NM11, but in the second embodiment, interface circuits 211 and 212 are configured using bipolar transistors Q201 and Q211.

Figure 5:
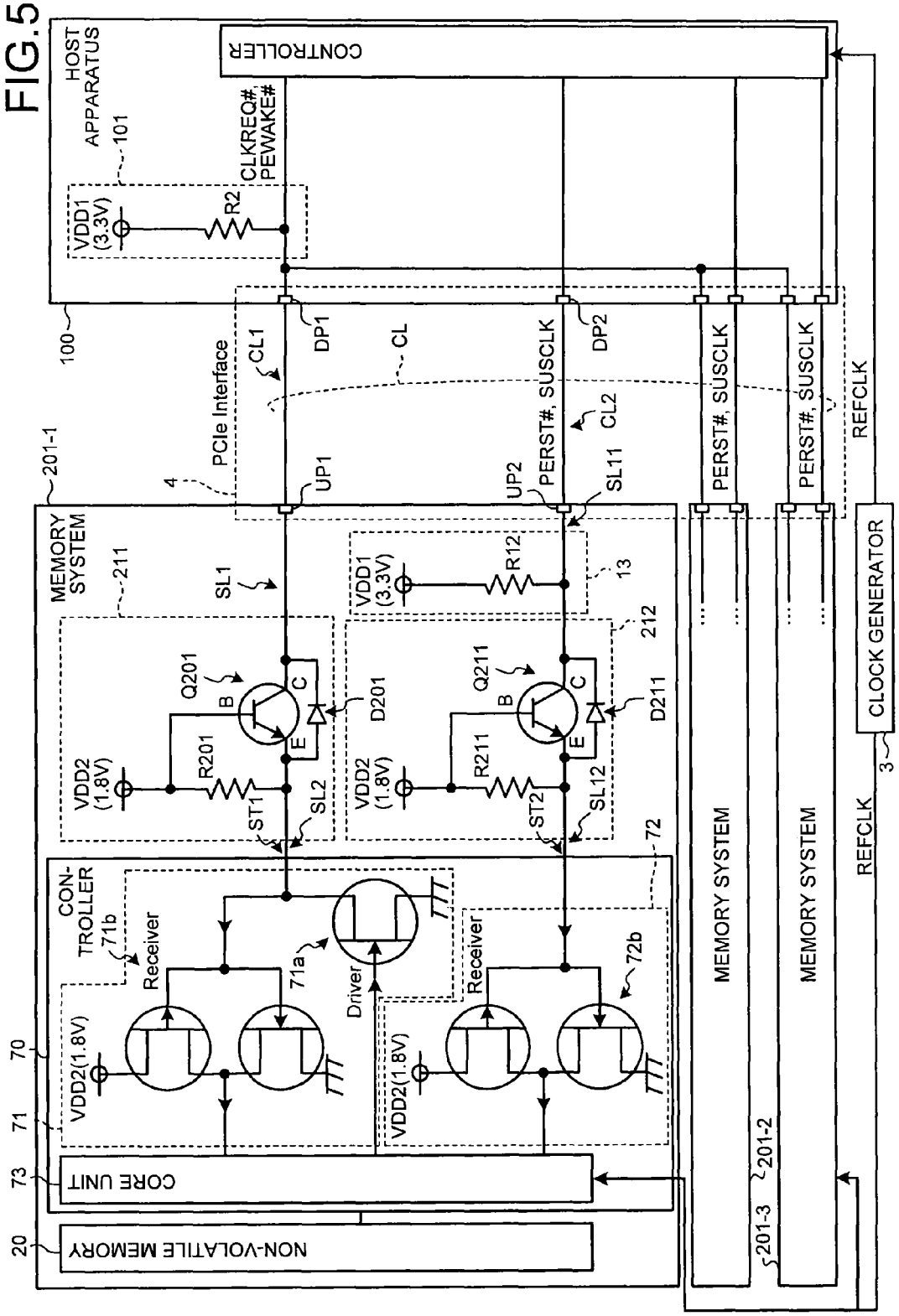
FIG. 5 is a block diagram illustrating a configuration of a memory system according to a second embodiment.

Specifically, as illustrated in FIG. 5, the memory system 201 includes the interface circuits 211 and 212 instead of the interface circuits 11 and 12.

The interface circuit 211 includes the bipolar transistor Q201, a diode (a rectifying element) D201, and a resistive element R201.

The bipolar transistor Q201 is inserted between the signal line SL2 and the signal line SL1. The bipolar transistor Q201, for example, is an NPN transistor of which the emitter is connected to the signal line SL2 and the collector is connected to the signal line SL1.

The diode D201 is configured such that the anode is connected to the emitter of the bipolar transistor Q201 and the cathode is connected to the collector of the bipolar transistor Q201.

The resistive element R201 is inserted between the signal line SL2, the emitter of the bipolar transistor Q201, the second power source level VDD2, and the base of the bipolar transistor Q201. The resistive element R201 is configured such that one end is connected to the second power source level VDD2 and the base of the bipolar transistor Q201, and the other end is connected to the signal line SL2 and the emitter of the bipolar transistor Q201. The resistive element R201 serves as a pull-up resistor which pulls up the potential of the signal line SL2, and serves as a resistor which adjusts the base-emitter voltage of the bipolar transistor Q201 according to the potential of the signal line SL2. Even when an input leakage current flows into the resistive element R201 to cause a voltage drop, the resistance of the resistive element R201 is set to be small enough for the potential of the signal line SL2 to fall within a range of the H level.

The base-emitter voltage of the bipolar transistor Q201 is adjusted by the resistive element R201, and as a result the bipolar transistor Q201 is turned off when the signal line SL2 is at a potential (the H level) according to the second power source level VDD2. The bipolar transistor Q201 is turned on when the signal line SL2 is at a potential (the L level) according to a reference level. For example, the bipolar transistor Q201 has a threshold voltage Vthbe between base and the emitter, and the threshold voltage Vthbe is smaller than a difference between a minimum value of the second power source level VDD2 and a maximum value at the L level of the signal line SL2. For example, there is considered a case where a voltage range from 1.62 V to 1.98 V is allowed for the second power source level VDD2 (the H level of the signal line SL2) of which the reference value is 1.8 V, and a voltage range from 0 V to 0.4 V is allowed for the L level of the signal line SL2. In this case, since the minimum value of the second power source level VDD2 is 1.62 V, the maximum value of the L level of the signal line SL2 is 0.4 V, the following Equation 3 is satisfied.

$$\text{Vthbe} < 1.62\ V - 0.4\ V = 1.22\ V \qquad \text{Equation 3}$$

It should be noted that the operation of the interface circuit 211 is the same as that of the interface circuit 11.

The interface circuit 212 includes the bipolar transistor Q211, a diode (a rectifying element) D211, and a resistive element R211.

The bipolar transistor Q211 is inserted between the signal line SL12 and the signal line SL11. The bipolar transistor Q211, for example, is an NPN transistor of which the emitter is connected to the signal line SL12, and the collector is connected to the signal line SL11.

The diode D211 is configured such that the anode is connected to the emitter of the bipolar transistor Q211 and the cathode is connected to the collector of the bipolar transistor Q211.

The resistive element R211 is inserted between the signal line SL12, the emitter of the bipolar transistor Q211, the second power source level VDD2, and the base of the bipolar transistor Q211. The resistive element R211 is configured such that one end is connected to the second power source level VDD2 and the base of the bipolar transistor Q211, and the other end is connected to the signal line SL12 and the emitter of the bipolar transistor Q211. The resistive element R211 serves as a pull-up resistor which pulls up the potential of the signal line SL12, and serves as a resistor which adjusts the base-emitter voltage of the bipolar transistor Q211 according to the potential of the signal line SL12. Even when an input leakage current flows into the resistive element R211 to cause a voltage drop, the resistance of the resistive element R211 is set to be small enough for the potential of the signal line SL12 to fall within a range of the H level.

The bipolar transistor Q211 is turned off according to the adjusted base-emitter voltage by the resistive element R211 when the signal line SL12 is at the potential (the H level) according to the second power source level VDD2 and turned on when the signal line SL12 is at the potential (the L level) according to the reference level. For example, the bipolar transistor Q211 has a threshold voltage Vthbe' between base and the emitter, and the threshold voltage Vthbe' is smaller than a difference between a minimum value of the second power source level VDD2 and a maximum value at the L level of the signal line SL12. For example, there is considered a case where a voltage range from 1.62 V to 1.98 V is allowed for the second power source level VDD2 (the H level of the signal line SL2) of which the reference value is 1.8 V, and a voltage range from 0 V to 0.4 V is allowed for the L level of the signal line SL2. In this case, since the minimum value of the second power source level VDD2 is 1.62 V, the maximum value of the L level of the signal line SL12 is 0.4 V, the following Equation 4 is satisfied.

$$\text{Vthbe}' < 1.62\ V - 0.4\ V = 1.22\ V \qquad \text{Equation 4}$$

It should be noted that the operation of the interface circuit 212 is the same as that of the interface circuit 12.

As described above, according to the second embodiment, in the memory system 201, the interface circuits 211 and 212 include the bipolar transistors Q201 and Q211. The bipolar transistors Q201 and Q211 is turned off when the signal lines SL2 and SL12 are at the potential (the H level) according to the second power source level VDD2, and turned on when the signal lines SL2 and SL12 are at the potential (the L level) according to the reference level. Therefore, the interface circuits 211 and 212 can perform the level conversion between the first power source level VDD1 in the host apparatus 100 and the second power source level VDD2 (<VDD1) in the controller 70.

Further, according to the second embodiment, in the memory system 201, the interface circuits 211 and 212 include the bipolar transistors Q201 and Q211. The bipolar transistors Q201 and Q211 are turned off according to the deactivation of the second power source level VDD2. Therefore, when the second power source level VDD2 is deactivated, it is possible to electrically disconnect the host apparatus 100 from the controller 70.

Further, according to the second embodiment, in the memory system 201, the interface circuits 211 and 212 transmit the signal transmitted from the controller 70 to the host apparatus 100 using the bipolar transistors Q201 and Q211. The interface circuits 211 and 212 transmit the signal received from the host apparatus 100 to the controller 70 using the diodes D201 and D211. Therefore, the interface circuits 211 and 212 can bidirectionally transmit the signal between the host apparatus 100 and the controller 70 using the bipolar transistors Q201 and Q211, respectively.

Further, according to the second embodiment, in the memory system 201, the interface circuits 211 and 212 include the resistive elements R201 and R211. One ends of the resistive elements R201 and R211 are respectively connected to the second power source level VDD2 and the gates of the bipolar transistors Q201 and Q211, and the other ends are respectively connected to the signal lines SL2 and SL12 and the source of the transistor. Therefore, the bipolar transistors Q201 and Q211 can be turned off when the signal lines SL2 and SL12 are at the potential (the H level) according to the second power source level VDD2, and turned on when the signal lines SL2 and SL12 are at the potential (the L level) according to the reference level. Further, the bipolar transistors Q201 and Q211 can be turned off according to the deactivation of the second power source level VDD2.

For example, when a power source of the memory system 1-1 is turned off and power sources of other memory systems 1-2, 1-3 are turned on, a power source of the host apparatus 100 is turned on in order to access the other memory systems 1-2, 1-3. In a case where a power source of the memory system 1-1 is turned off and a power source of the host apparatus 100 is turned on, the communication line CL1 enters a state in which the potential thereof is pulled up to the first power source level (for example, 3.3 V) VDD1 in the host apparatus 100. Even in this case, since the interface circuit 211 electrically disconnects the host apparatus 100 from the controller 70, the application of the first power source level VDD1 to the controller 70 can be avoided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
   a non-volatile memory;
   a controller configured to control the non-volatile memory;
   a first interface circuit configured to perform level conversion between a first power source level and a second power source level which is lower than the first power source level, the second power source level being a driving voltage of the controller;
   a first signal line configured to connect to the first interface circuit; and
   a second signal line configured to connect the first interface circuit and a signal terminal of the controller, a potential of the second signal line being able to be pulled up to the second power source level.

2. The memory system according to claim 1, wherein
   a potential of the first signal line is able to be pulled up to the first power source level, in a case where the first signal line is connected to a host apparatus through a connector, and
   the first power source level is a power source level of a signal received from the host apparatus.

3. The memory system according to claim 1, wherein
   the first interface circuit includes a transistor which is inserted between the first signal line and the second signal line, turned off when a potential of the second signal line is the second power source level, and turned on when the potential of the second signal line is a potential corresponding to a reference level.

4. The memory system according to claim 2, wherein
   the first interface circuit is configured to electrically disconnect the host apparatus from the controller when a power source of the controller is turned off.

5. The memory system according to claim 4, wherein
   the first interface circuit is configured to electrically disconnect the host apparatus from the controller when a power source of the controller is turned off, in a case where a plurality of memory systems including the memory system connect to the host apparatus.

6. The memory system according to claim 2, wherein
   the first interface circuit is configured to bidirectionally transmit a signal between the host apparatus with using the first signal line and the second signal line.

7. The memory system according to claim 6, wherein
   the first interface circuit includes a first rectifying element of which cathode is connected to the first signal line and anode is connected to the second signal line.

8. The memory system according to claim 7, wherein
the first interface circuit includes a first field effect transistor of which drain is connected to the first signal line and source is connected to the second signal line, and
the first rectifying element is a parasitic diode of the first field effect transistor.

9. The memory system according to claim 8, wherein
the first interface circuit further includes a first resistive element of which one end is connected to gate of the first field effect transistor and the second power source level, and another end is connected to the second signal line.

10. The memory system according to claim 7, wherein
the first interface circuit includes a first bipolar transistor of which collector is connected to the first signal line and emitter is connected to the second signal line, and
cathode of the first rectifying element is connected to the collector of the first bipolar transistor, and anode of the first rectifying element is connected to the emitter of the first bipolar transistor.

11. The memory system according to claim 10, wherein
the first interface circuit further includes a first resistive element of which one end is connected to base of the first bipolar transistor and the second power source level, and another end is connected to the second signal line.

12. The memory system according to claim 1, further comprising:
a second interface circuit configured to perform level conversion between the first power source level and the second power source level;
a third signal line configured to connect to the second interface circuit; and
a fourth signal line configured to connect the second interface circuit and a signal terminal of the controller, a potential of the fourth signal line being able to be pulled up to the second power source level.

13. The memory system according to claim 12, wherein
each of a potential of the first signal line and a potential of the third signal line is able to be pulled up to the first power source level, in a case where each of the first signal line and the third signal line is connected to a host apparatus through a connector, and the first power source level is a power source level of a signal received from the host apparatus.

14. The memory system according to claim 12, wherein
the second interface circuit includes a transistor which is inserted between the third signal line and the fourth signal line, turned off when a potential of the fourth signal line is at the second power source level, and turned on when the potential of the fourth signal line is a potential corresponding to a reference level.

15. The memory system according to claim 13, wherein
the second interface circuit is configured to bidirectionally transmit a signal between the host apparatus with using the third signal line and the fourth signal line.

16. The memory system according to claim 15, wherein
the second interface circuit includes a second rectifying element of which cathode is connected to the third signal line and anode is connected to the fourth signal line.

17. The memory system according to claim 16, wherein
the second interface circuit includes a second field effect transistor of which drain is connected to the third signal line and source is connected to the fourth signal line, and
the second rectifying element is a parasitic diode of the second field effect transistor.

18. The memory system according to claim 17, wherein
the second interface circuit further includes a second resistive element of which one end is connected to gate of the second field effect transistor and the second power source level, and another end is connected to the fourth signal line.

19. The memory system according to claim 16, wherein
the second interface circuit includes a second bipolar transistor of which collector is connected to the third signal line and emitter is connected to the fourth signal line, and
cathode of the second rectifying element is connected to the collector of the second bipolar transistor, and anode of the second rectifying element is connected to the emitter of the second bipolar transistor.

20. The memory system according to claim 1, wherein
the first power source level is a power source level based on a PCIe standard.

* * * * *